(12) United States Patent
Mehra et al.

(10) Patent No.: US 8,942,072 B2
(45) Date of Patent: Jan. 27, 2015

(54) EFFICIENT ACCESS TO STORAGE DEVICES WITH USAGE BITMAPS

(71) Applicant: Microsoft Corporation, Redmond, WA (US)

(72) Inventors: Karan Mehra, Sammamish, WA (US); Surendra Verma, Bellevue, WA (US); John R. Dietrick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/906,821

(22) Filed: May 31, 2013

(65) Prior Publication Data

US 2013/0265862 A1    Oct. 10, 2013

Related U.S. Application Data

(63) Continuation of application No. 13/230,840, filed on Sep. 12, 2011, now Pat. No. 8,456,972.

(51) Int. Cl.
*G11B 21/08* (2006.01)
*G11B 15/02* (2006.01)

(52) U.S. Cl.
USPC ..................................... 369/30.01; 369/47.23

(58) Field of Classification Search
USPC ............ 369/53.1, 53.16, 53.17, 53.31, 53.44, 369/47.1, 47.27, 53.15, 47.18, 53.13, 53.14, 369/47.23; 711/163, 162, 114
See application file for complete search history.

(56) References Cited

U.S. PATENT DOCUMENTS

| 5,537,636 | A  | 7/1996  | Uchida et al. |
| 5,848,038 | A  | 12/1998 | Igarashi |
| 6,799,244 | B2 | 9/2004  | Tanaka et al. |
| 7,035,974 | B2 | 4/2006  | Shang |
| 7,162,401 | B1 | 1/2007  | Abeles |

(Continued)

FOREIGN PATENT DOCUMENTS

| CN | 101349963 A | 1/2009 |
| CN | 102937882   | 2/2013 |

(Continued)

OTHER PUBLICATIONS

International Search Report cited in Application No. PCT/US2012/054887 Filed Date: Sep. 12, 2012 pp. 1-10.

(Continued)

*Primary Examiner* — Nabil Hindi
(74) *Attorney, Agent, or Firm* — John Jardine; Kate Drakos; Micky Minhas (57) ABSTRACT

Upon receiving a request to allocate a storage region, a storage device may initialize the contents of the storage device to default values (e.g., zero) in order to avoid problems arising from unknown data stored in the locations of the storage region (e.g., upon writing a data set to a location involved in a mirroring relationship, uninitialized data in the corresponding mirror location may result in a mismatch that jeopardizes the written data). However, initializing the storage device may be time-consuming and inefficient. Instead, a usage bitmap may be generated that, for respective location sets of the storage region, indicates whether values exist in the location. A read request may be fulfilled by examining the usage bitmap to determine whether values exist in the specified location, and if not, the default value may be returned without accessing the storage device. Other efficiencies may also be achieved using the usage bitmap.

20 Claims, 3 Drawing Sheets

(56) References Cited

U.S. PATENT DOCUMENTS

| | | |
|---|---|---|
| 7,392,357 B2 | 6/2008 | Ebata |
| 7,457,928 B2 | 11/2008 | Evanchik et al. |
| 7,486,593 B2 | 2/2009 | Aria |
| 7,562,188 B2 | 7/2009 | Cavallo |
| 7,574,560 B2 * | 8/2009 | MacHardy et al. ........... 711/114 |
| 7,607,034 B2 | 10/2009 | Yasuhara |
| 7,675,828 B2 | 3/2010 | Park et al. |
| 7,774,346 B2 | 8/2010 | Hu et al. |
| 7,873,782 B2 | 1/2011 | Terry et al. |
| 8,036,079 B2 | 10/2011 | Kuraoka et al. |
| 8,121,007 B2 | 2/2012 | Nagar et al. |
| 8,271,753 B2 | 9/2012 | Nemotoa et al. |
| 2005/0034012 A1 | 2/2005 | Bartlett et al. |
| 2005/0071593 A1 | 3/2005 | Vincent |
| 2005/0144381 A1 | 6/2005 | Corrado |
| 2007/0050381 A1 | 3/2007 | Hu et al. |
| 2007/0136810 A1 | 6/2007 | Waltermann et al. |
| 2007/0156957 A1 | 7/2007 | MacHardy et al. |
| 2007/0174580 A1 | 7/2007 | Shulga |
| 2008/0046667 A1 | 2/2008 | Fachan et al. |
| 2008/0222214 A1 | 9/2008 | Tokuda et al. |
| 2009/0024791 A1 | 1/2009 | Lee et al. |
| 2009/0106334 A1 | 4/2009 | Day |
| 2009/0172273 A1 | 7/2009 | Piszczek et al. |
| 2010/0138603 A1 | 6/2010 | Mukker |
| 2011/0035549 A1 | 2/2011 | Baek |
| 2013/0067174 A1 | 3/2013 | Moss |

FOREIGN PATENT DOCUMENTS

| | | |
|---|---|---|
| CN | 102945201 | 2/2013 |
| JP | 2011021806 A | 2/2001 |

OTHER PUBLICATIONS

International Search Report cited in Application No. PCT/2011/055818 Filed Date: Sep. 28, 2012 pp. 1-8.
Bonwick, Jeff; "RAID-Z" http://blogs.oracle.com/bonwick/entry/raid_z Published Date: Nov. 18, 2005 pp. 1-5.
Wan, Jiguang, et al.; "S2-RAID: A New RAID Architecture for Fast Data Recovery", 2010 IEEE 26th Symposium on Mass Storage Systems and Technologies http://storageconference.org/2010/Papers/MSST/Wan.pdf Published Date: May 3, 2010 pp. 1-9.
Alvarez, Guillermo A., et al.; "Tolerating Multiple Failures in RAID Architectures with Optimal Storage and Uniform DeClustering". http://academic.research.microsoft.com/Paper/550792 Published Date: Jun. 2, 1997 pp. 1-11.
Lorenz, Christine, et al.; "Characteristics of Linux RAID levels" EVMS User Guide http://linux.die.net/EVMSUG/characraidlvls.html Published Date: Sep. 16, 2004 pp. 1-4.
Sue, Jeff.; "How RAID Storage Improves Performance", http://www.file-drivers.com/article/PC_hardware/842.html Published Date: Mar. 12, 2009 pp. 1-15.
Prakash, Ravi., et al.; "Improving RAID Storage Systems with Non-volatile Write Journals". http://www.rtcmagazine.com/articles/view/101528 Published Date: Mar. 2010 pp. 1-5.
"VERITAS Storage Foundation 4.0". Solaris. http://sfdoccentral.symantec.com/sf/4.0/solaris/pdf/sf_ora_notes.pdf Published: Jan. 2004 pp. 1-12.
"HP Battery Backed Write Cache Enable (Enables RAID 5)" ttp://web.techbuy.com.au/p/84480/SYSTEMS_HP_ACCESSORIES/HP/351580-B21.asp Published Date: Dec. 5, 2008 pp. 1.
Notice of Allowance cited in related U.S. Appl. No. 13/230,840 Dated: Feb. 5, 2013 pp. 1-18.
Amendment cited in related U.S. Appl. No. 13/230,840 Dated: Jan. 17, 2013 pp. 1-18.
Non Final Office Action cited in related U.S. Appl. No. 13/230,840 Dated: Oct. 17, 2012 pp. 1-22.
Int. Preliminary Report cited in PCT Application No. PCT/US2011/055818 dated Mar. 12, 2014, 4 pgs.
Int. Preliminary Report cited in PCT Application No. PCT/US2012/054887 dated Mar. 12, 3014, 5 pgs.
Non-Final Office Action cited in U.S. Appl. No. 13/229,736 dated Jul. 30, 2013, 23 pgs.
Reply Non-Final Office Action cited in U.S. Appl. No. 13/229,736 dated Dec. 2, 2013, 17 pgs.
Final Office Action cited in U.S. Appl. No. 13/229,736 dated Feb. 4, 2014, 18 pgs.
Reply Final Office Action cited in U.S. Appl. No. 13/229,736 dated May 5, 2014, 17 pgs.
Non-Final Office Action cited in U.S. Appl. No. 13/906,778 dated Oct. 2, 2013, 9 pgs.
Non-Final Office Action cited in U.S. Appl. No. 13/229,736 dated Jun. 13, 2014, 19 pgs.
Reply Non-Final Office Action cited in U.S. Appl. No. 13/906,778 dated Aug. 12, 2014, 12 pgs.
"First Office Action and Search Report Issued in Chinese Patent Application No. 201210335701.1", Mailed Date: Oct. 23, 2014, 11 Pages.

* cited by examiner

EFFICIENT ACCESS TO STORAGE DEVICES WITH USAGE BITMAPS

BACKGROUND

Within the field, many scenarios involve the storage of values to a storage device set comprising at least one storage device, such as a collection of hard disk drives or a Redundant Array of Inexpensive Disks (RAID). When a storage device is first provided, or when capacity on a storage device is deallocated and then reallocated, the physical media of the storage device may be initialized; e.g., the locations of the storage device may be wiped to a default value. This initialization may enable a process that accesses a location of the storage device where a value not yet been written to receive a specific value rather than an arbitrary value, including the previously written value in a deallocated area.

The initialization of a storage device may also be significant in storage scenarios involving a location set of comprising at least two associated locations, where the values stored therein have a particular relationship. As a first example, in a mirroring resiliency plan, identical copies of a storage set may be stored at two or more locations (often on different storage devices), such that a value stored in one location is anticipated to match the value stored in one or more other locations involved in the mirroring relationship. As a second example, in a parity resiliency plan, when a set of data values is written to data locations of a location set, a parity of the written values may be calculated and stored in a parity location of the location set that is reserved for the parity value, which may enable error detection, error correction, and the reconstruction of the data values in the event of a failure of some of the storage devices storing the values of the location set. In these scenarios, a failure to initialize a location may impact the confidence in the validity of the associated data sets; e.g., if data is written to a first mirror location but a failure occurs before the same data can be written to the associated location, a mismatch may arise that erodes confidence in the value stored in the first mirror location, and possibly in the remainder of the storage device set.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While initializing the values of a storage device may avoid some disadvantages, the process of initialization may present several forms of inefficiency. As a first example, a request to allocate capacity in a storage region may involve a write of every location of an initialization value (e.g., zero) to the entire contents of the storage region, which may comprise a protracted process, particularly for storage regions of large capacity and/or slow throughput. As a second example, the initialization of a location may be followed by a first access that comprises a write request; the initialization in this case therefore did not achieve any value, and may have been avoidable. As a third example, initializing a storage region with a default value and then reading unwritten locations of the storage region may predictably return the default value, and may have been avoided if the location may have been determined to be unwritten with a value.

Presented herein are techniques for reducing the inefficiencies caused by the initialization of a storage region by simply not initializing the storage region (e.g., not writing the default value to the locations of the storage region). Instead, a computer or other device may generate a usage bitmap that records, for respective location sets of the storage region, a bit indicating whether or not the location set has been written since the storage region was allocated. Upon receiving a read request specifying a location, the computer may check the usage bitmap to determine whether data values have been written to the location set comprising the location. If the usage bitmap indicates that values exist in the locations of the location set, the read request may be satisfied by reading and returning the value stored in the location on the storage device. However, if the usage bitmap indicates that values do not exist in the locations of the location set, the computer may refrain from accessing the storage device, and may simply return the default value. These and other uses of a usage bitmap generated as presented herein may improve the efficiency of the storage set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Background

Within the field of computing, many scenarios involve the accessing of nonvolatile storage devices of a storage device set. Such storage devices may comprise many types (e.g., hard disk drives; solid-state storage devices; and magnetic or optical discs), and may be utilized to store many types of data (e.g., files, email messages, database records, or media objects, or combinations thereof). The storage devices may be attached to a particular computer or device, or may be connected to and accessed through a network. The storage devices may also operate independently (e.g., without intercommunication or even mutual awareness of other storage devices of the storage device set); with loose collaboration (e.g., in communication and exchanging notifications of status); or with tight interoperation (e.g., a set of hard disk drives loaded into a storage controller, such as a Redundant Array of Inexpensive Disks (RAID) appliance). Also, the interoperation and/or use of the storage devices may result in logical or practical partitions between the data stored thereamong, or may result in an aggregation of data. For example, the available capacity of two or more storage devices may be aggregated into a storage pool that is presented to a computer as a single integrated volume.

The storage devices may also implement various layout plans, such as spanning (e.g., logically concatenating the capacity of the storage devices); striping (e.g., interleaving sequential logical addresses across the storage devices); mirroring (e.g., storing identical copies of a data set on respective storage devices of the storage device set, and maintaining the identity of the copies by automatically and concurrently applying changes to the data set to all of the copies); and parity calculations (e.g., when data is stored on one or more storage devices, a checksum of the stored data may automatically be calculated and stored on a different storage device, e.g., in order to enable recovery from a failure of a storage device). Additionally, the capacity of the storage devices may be provisioned according to various provisioning plans. As a first example, in a fixed provisioning plan, when a request to allocate a storage region is received, one or more storage devices may promptly allocate all of the capacity requested in the provisioning request, and may inform the requesting user or process that such capacity is available (and may optionally initialize the capacity with a default value). As a second example, in a delayed provisioning plan, when a request to allocate a storage region is received, the storage devices may indicate that the storage region is available for writing, but may not promptly allocate capacity for the storage region. Rather, the storage devices may await an access request to a location within the storage region, and upon receiving the access request, may promptly allocate physical storage (e.g., an extent) of a storage device and bind it to the logical address of the location. This "just-in-time" delayed provisioning may present some performance improvements (e.g., promptly fulfilling a request to generate the storage device, and/or a more efficient allocation of the available capacity of the storage device set than allocating capacity for a storage region that remains unused). As an additional variation, in a "thin" provisioning plan, the storage device set may authorize requests to allocate capacity that exceed the available capacity of the storage device set. Instead, the storage device set may allocate the capacity as used, and upon running low on available capacity, may notify an administrator to add storage devices that provide additional capacity. These and other types of layout and/or provisioning plans may be applied to the storage devices.

Upon allocating a storage region of a storage device, the storage device may be configured to initialize the locations of the storage region with default values (e.g., zero) in order to remove the uninitialized values from the storage region, such as the contents of a previously deallocated storage region. The initialization may be significant for several reasons. As a first example, a process may request a read from a location of the storage region before writing a value to it. Without initialization, the value stored at the location may be unpredictable, and the behavior of the process after reading the unpredictable value may be non-deterministic or unexpected. As a second example, some storage regions may store location sets respectively comprising two or more locations having an association. The relationship may be compromised if a value is stored at a first location of the location set while arbitrary data is stored in the associated locations of the location set. As a first example, mirrored storage sets may involve a data set that is stored as two or more identical copies in different locations, and that are kept in synchrony by applying a write to one location to the corresponding mirrored locations. If a value is written to a first such location, but the mirrored locations are not initialized, a mismatch may be detected that jeopardizes the confidence that the value written to the first location is valid. As a second example, a location set may involve two or more data values that, when stored to the location set, result in the calculation of a parity value for the data values that is stored in a parity location of the location set. The parity value may enable the detection and/or correction of errors. The parity values may also enable a reconstruction of data of the location set that was stored on a storage device that has failed; e.g., the values stored in the other locations of the location set, along with the parity value, may be used to infer the value stored on the failed storage device and the replacement of the value in a substitute storage region. However, the presence of an uninitialized value in any of the locations of the location set may result in the reconstruction of incorrect data into the substitute storage region. The initialization of the values in a newly allocated storage device may avoid these and other problems in various computing scenarios.

However, the initialization of values of a storage region may also present several forms of inefficiency. As a first example, the process of writing a default value to an entire storage set, in response to a request to allocate a storage region, may take a long time, and may delay the fulfillment of the allocation request. As a second example, in many cases, the writing of the default value to a location may provide little or no value. As a first such example, if the initialization of a location is followed by a write of a data value to the location (without first reading the value stored there), the initialization of the location with a default value may have provided no value. As a second such example, if the initialization of a location is following by a read of the data value at the location (without first writing a value to the location), the result may be predicted as the default value without reading the value from the location of the storage device. For these and other reasons, the initialization of the locations of the storage region may unhelpfully consume the time and resources of the computer and storage devices without providing value or advantage.

B. Presented Techniques

Figure 1:
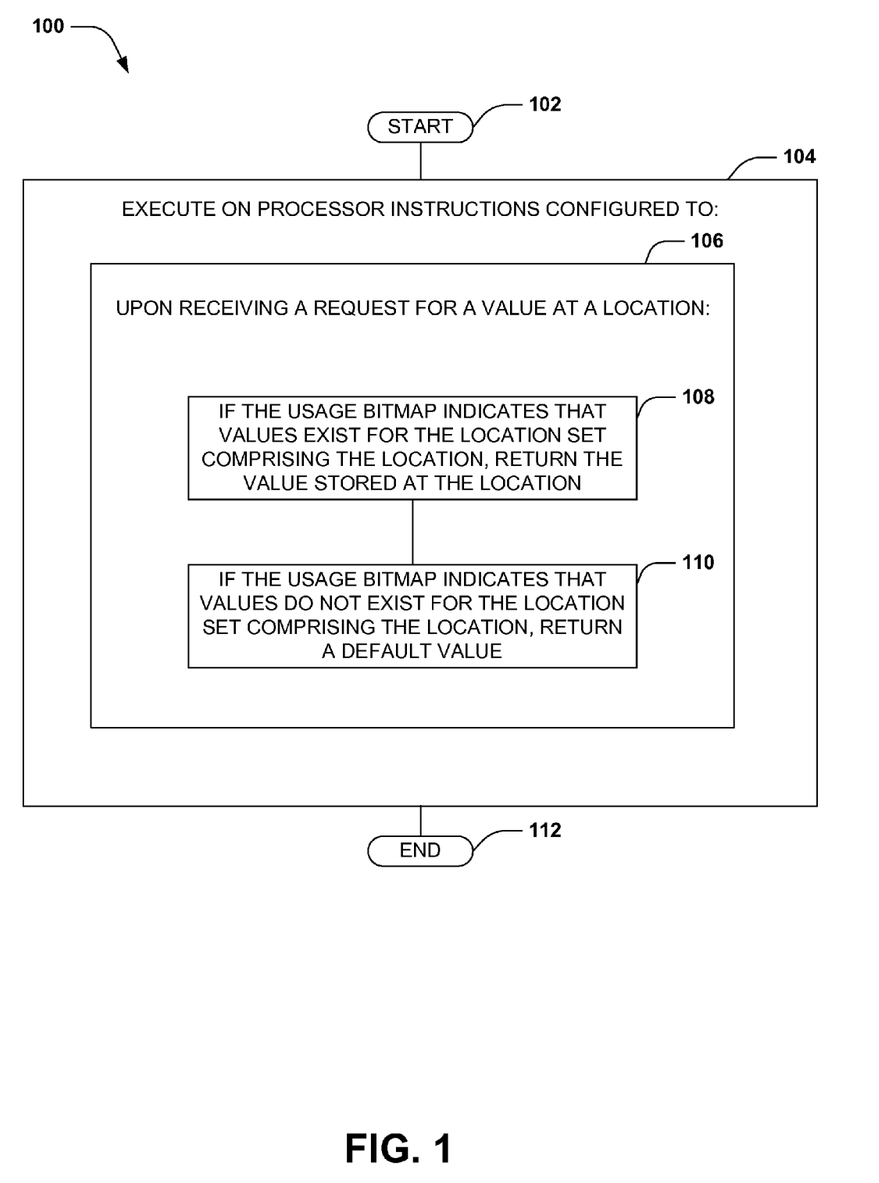
FIG. 1 is a flow chart illustrating an exemplary method of reading values from a storage set.

Presented herein are techniques for presenting values stored in the locations of a storage region of a storage device in a comparatively performant manner. In accordance with these techniques, a newly allocated storage set may not be initialized with the default values. Rather, a usage bitmap may be generated, where respective bits indicate, for respective location sets of the storage region, whether values have been stored and exist in the location set. Read requests may therefore be satisfied in part with reference to the usage bitmap; e.g., the C. Exemplary Embodiments FIG. 1 presents a first embodiment of these techniques, illustrated as an exemplary method 100 of presenting values stored in location sets comprising at least two locations of a storage set of a storage region comprising a usage bitmap. The exemplary method may be implemented, e.g., as a set of instructions stored in a memory component of a computer (e.g., a memory circuit, a platter of a hard disk drive, a solid-state storage device, or a magnetic or optical disc) that, when executed by a processor of the computer, cause the computer to present the values stored in the location sets according to the techniques presented herein. The exemplary method 100 begins at 102 and involves executing 104 on the processor instructions configured to cause the computer to operate according to the techniques presented herein. In particular, the instructions are configured to, upon receiving a read request for a value at a location, determine whether the usage bitmap indicates that value exist for the location set comprising the location. If the usage bitmap indicates that values exist for the location set comprising the location, the instructions are configured to return 106 the value stored at the location. However, if the usage bitmap indicates that values do not exist for the location set comprising the location, the instructions are configured to return 110 a default value. In this manner, the exemplary scenario achieves the presentation of values of the storage set in accordance with the techniques presented herein, and so ends at 112.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 2:
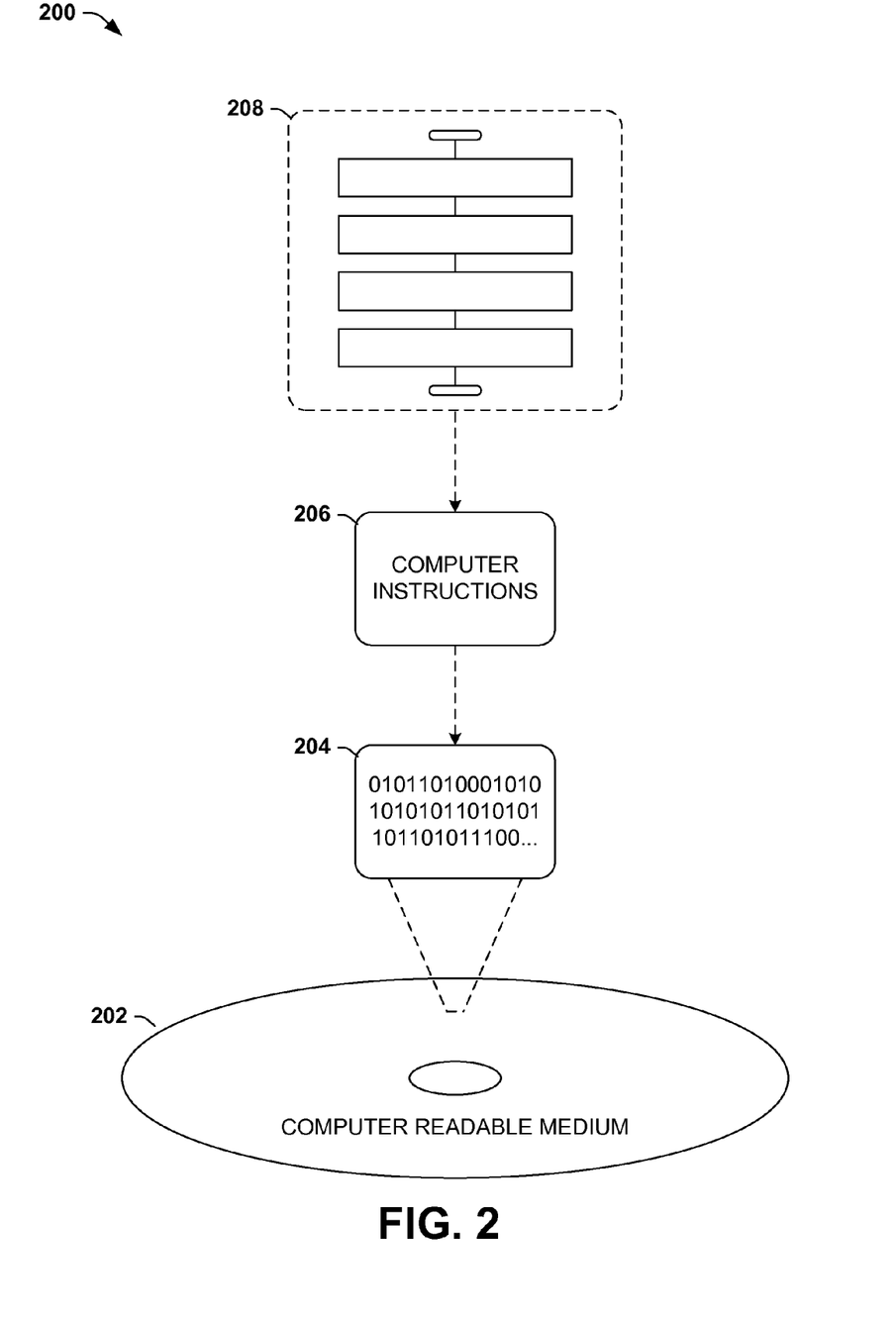
FIG. 2 is an illustration of an exemplary computer-readable medium comprising processor-executable instructions configured to embody one or more of the provisions set forth herein.

An exemplary computer-readable medium that may be devised in these ways is illustrated in FIG. 2, wherein the implementation 200 comprises a computer-readable medium 202 (e.g., a CD-R, DVD-R, or a platter of a hard disk drive), on which is encoded computer-readable data 204. This computer-readable data 204 in turn comprises a set of computer instructions 206 configured to operate according to the principles set forth herein. In one such embodiment, the processor-executable instructions 206 may be configured to perform a method of reading values from a storage set, such as the exemplary method 100 of FIG. 1. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used with many types of storage devices, including hard disk drives, solid-state storage devices, nonvolatile memory circuits, tape-based storage devices, and magnetic and optical discs. Such storage devices may also be directly connected to a device (such as a computer) implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet). Moreover, these techniques may be used with two or more storage devices operating independently (e.g., storage devices that are accessed independently through a software process); operating with loose interoperation (e.g., storage devices that operate independently but that are informed of and may communicate with the other storage devices sharing the storage set); or operating with tight interoperation (e.g., a Redundant Array of Inexpensive Disks (RAID) controller managing several storage devices as components of a storage system).

As a second variation of this first aspect, these techniques may be used in conjunction with many types of storage sets comprising various types of data sets, including binary storage systems storing various types of binary objects; file systems storing files; media libraries storing media objects; object systems storing many types of objects; databases storing records; and email systems storing email messages.

As a third variation of this first aspect, portions or all of these techniques may be implemented within one or more components within the computing environment, such as a set of software instructions stored in a volatile or nonvolatile of a computer or device having access to the storage devices (e.g., an operating system process or a hardware driver); by a storage system configured to interface with the storage devices (e.g., a RAID controller); or in respective storage devices of the storage set.

As a fourth variation of this first aspect, the volatile memory representation generated and used by the techniques presented herein may present many structures. As one such example, the volatile memory representation may be structured as a set of interrelated records or objects, such as a logical disk set comprising logical disks respectively represented as a sequence of slabs; a slab set comprising slabs respectively represented as a collection of extents; and an extent set comprising extents respectively represented as a storage device, a physical address, and an extent length. Moreover, this collection of interrelated records or objects may represent a particular organization, e.g., a hierarchical structure comprising a first hierarchical level representing the logical disks; a second hierarchical level representing the slabs; and a third hierarchical level representing the extents. Locations within a logical disk manifested by the storage device set may therefore be located by first identifying the slab comprising the location of the logical disk, and then identifying at least one extent within the slab comprising the location.

As a fifth variation of this first aspect, the accessing of the storage device set through the techniques presented herein may enable particular types of flexibility in the storage device set. As a first example, a first slab may be allocated for a logical disk specifying a first layout plan, and a second slab allocated for the logical disk specifying a second layout plan that is different from the first layout plan. As a second example, at least one capacity request received from an application specifying a slab usage, and the provisioning component configured to select a layout plan according to the slab usage of the slab. In particular, a first slab allocated for a logical disk having a first slab capacity, and a second slab allocated for the logical disk having a second slab capacity that is different from the first slab capacity.

As a sixth variation of this first aspect, many types of layout plans may be represented by the storage set. An exemplary layout plan set may include, e.g., a monolithic layout plan specifying an allocation of extents on one storage device; a striping layout plan specifying an allocation of extents on at least two storage devices that together provide the capacity of the slab allocation request; a mirroring layout plan specifying an allocation of extents that respectively provide the capacity of the slab allocation request and that are mirrored; and a verifying layout plan specifying an allocation of at least one data extent on at least one storage device that together provide the capacity of the slab allocation request, and at least one verifier extent on at least one other storage device that stores verifiers for the data extents. Those of ordinary skill in the art may devise many variations in the scenarios, organizations, and uses of the techniques presented herein.

D2. Variations of Techniques

A second aspect that may vary among embodiments involves the application of the techniques presented herein.

As a first example, upon receiving the allocation request to generate the storage region, an embodiment may refrain from initializing the storage region. As a second example, where at least one location set comprises at least two data locations respectively storing a data value, the parity location storing a parity value of the data values of the data locations. In such scenarios, upon receiving a write request to write at least one data value to respective locations of a location set, the embodiment may write the data values to the data locations; calculate a parity value for the location set; store the parity value at the parity location for the location set; and update the usage bitmap to indicate values existing at the locations of the location set. An embodiment may also calculate the parity value by, if the usage bitmap indicates data values existing at the location set, reading stored data values that are stored at other data locations of the location set; calculating the parity value using the stored data values and the data values of the write request; and if the usage bitmap does not indicate values existing at the location set, calculating the parity value using the data values of the write request and default values for other data locations of the location set. Moreover, where the write comprises at least one unwritten location of the location set not having a data value, the embodiment may, if the usage bitmap does not indicate values existing at the location set, write default values at respective unwritten locations of the location set. Alternatively, where the write request specifying data values for all data locations of the location set; the embodiment may calculate the parity value using the data values of the write request.

As another example, an embodiment may, upon receiving a request to discard the values of a location set, update the usage bitmap to indicate that values do not exist at the locations of the location set.

As another example, where respective location sets comprising at least two resilient values, an embodiment may, upon detecting a failure of a location of the location set, determine whether the usage bitmap indicates that values exist for the location set. If so, the embodiment may use other resilient values of the location set, restore the value at the location set. However, if not, the embodiment may refraining from restoring the value at the location set.

As another example, an embodiment may store the usage bitmap in the storage set. In particular, for storage sets comprising a journal configured to stage write requests to locations of the storage set, an embodiment may updating the usage bitmap comprising: updating the usage bitmap upon destaging a write request to a location of the storage set. For example, the journal of the storage set may comprise a log with a head pointer and a tail pointer, and writes to the storage set may first be stored in the journal (e.g., between the head pointer and the tail pointer), until they are eventually written out to the storage region. In such embodiments, rather than frequently writing the usage bitmap to the storage device, an embodiment may write the usage bitmap on the storage device just before writes are evicted from the journal (e.g., by incrementing the tail pointer past the values in the journal). This alternative may be feasible, e.g., because if the storage device fails prior to evicting the values from the journal, the written values are still stored in the journal on the physical medium, and the device may recover from the failure by replaying the writes in the journal. As another example, the storage set may comprise at least two storage regions and a usage bitmap array comprising usage bitmaps respectively storing indications of values existing in respective locations of a storage region.

Figure 3:
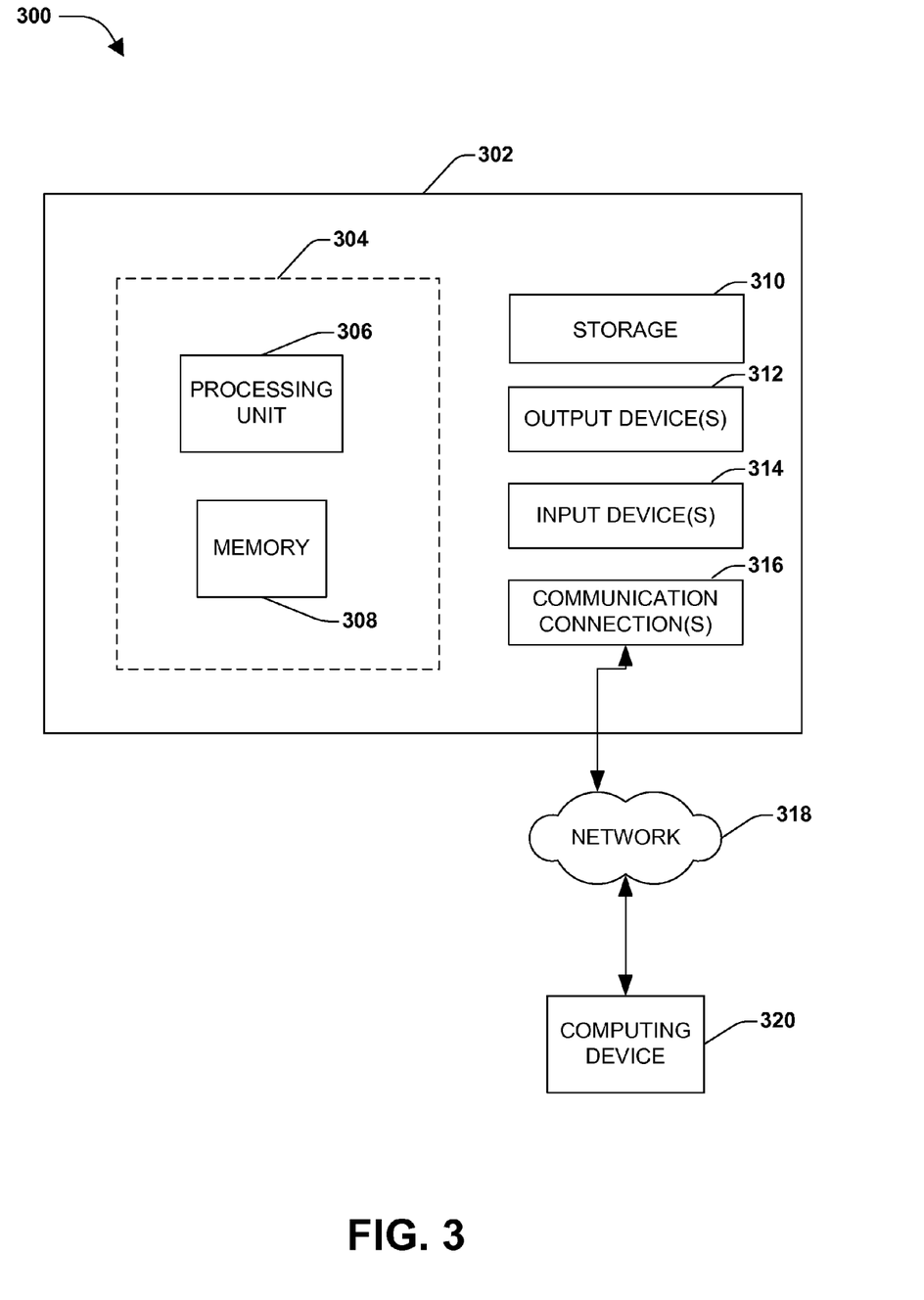
FIG. 3 illustrates an exemplary computing environment wherein one or more of the provisions set forth herein may be implemented.

As another example, the usage bitmap may be stored by compressing the usage bitmap to generate a compressed usage bitmap, and storing the compressed usage bitmap on the storage device. Moreover, it may be advantageous to compress the usage bitmap by run-length encoding the usage bitmap. Moreover, the embodiment may compute a compression ratio of the compressed usage bitmap, and may store the compressed usage bitmap in the storage set if the compression ratio is below a compression ratio threshold, but to store the uncompressed usage bitmap in the storage set if the compression ratio is not below the compression ratio threshold. As another example, an embodiment may be configured to store at least two usage bitmaps in at least two locations of the storage set, and to, upon receiving a usage bitmap read request to read the usage bitmap, read a latest usage bitmap in the usage bitmap sequence. For example, respective usage bitmaps stored with a sequence number, and each successive storage of the storage bitmap may be stored with a higher sequence number than the other usage bitmaps stored in the storage set (e.g., a continuously incrementing logical sequence number). Alternatively, the storage set may be stored in a usage bitmap log comprising at least two usage bitmap slots and a latest usage bitmap pointer. The usage bitmap may therefore be stored by incrementing the latest usage bitmap pointer, an storing the usage bitmap at the usage bitmap slot indicated by the latest usage bitmap pointer, and read by the usage bitmap in the usage bitmap slot indicated by the latest usage bitmap pointer. Those of ordinary skill in the art may devise many variations E. Computing Environment FIG. 3 and the following discussion provide a brief, general description of a suitable computing environment to implement embodiments of one or more of the provisions set forth herein. The operating environment of FIG. 3 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

FIG. 3 illustrates an example of a system 500 comprising a computing device 302 configured to implement one or more embodiments provided herein. In one configuration, computing device 302 includes at least one processing unit 306 and memory 308. Depending on the exact configuration and type of computing device, memory 308 may be volatile (such as RAM, for example), non-volatile (such as ROM, flash memory, etc., for example) or some combination of the two. This configuration is illustrated in FIG. 3 by dashed line 304.

In other embodiments, device 302 may include additional features and/or functionality. For example, device 302 may also include additional storage (e.g., removable and/or non-removable) including, but not limited to, magnetic storage, optical storage, and the like. Such additional storage is illustrated in FIG. 3 by storage 310. In one embodiment, computer readable instructions to implement one or more embodiments provided herein may be in storage 310. Storage 310 may also store other computer readable instructions to implement an operating system, an application program, and the like. Computer readable instructions may be loaded in memory 308 for execution by processing unit 306, for example.

The term "computer readable media" as used herein includes computer storage media. Computer storage media includes volatile and nonvolatile, removable and non-removable media implemented in any method or technology for storage of information such as computer readable instructions or other data. Memory 308 and storage 310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 302. Any such computer storage media may be part of device 302.

Device 302 may also include communication connection(s) 316 that allows device 302 to communicate with other devices. Communication connection(s) 316 may include, but is not limited to, a modem, a Network Interface Card (NIC), an integrated network interface, a radio frequency transmitter/receiver, an infrared port, a USB connection, or other interfaces for connecting computing device 302 to other computing devices. Communication connection(s) 316 may include a wired connection or a wireless connection. Communication connection(s) 316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 302 may include input device(s) 314 such as keyboard, mouse, pen, voice input device, touch input device, infrared cameras, video input devices, and/or any other input device. Output device(s) 312 such as one or more displays, speakers, printers, and/or any other output device may also be included in device 302. Input device(s) 314 and output device(s) 312 may be connected to device 302 via a wired connection, wireless connection, or any combination thereof. In one embodiment, an input device or an output device from another computing device may be used as input device(s) 314 or output device(s) 312 for computing device 302.

Components of computing device 302 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 302 may be interconnected by a network. For example, memory 308 may be comprised of multiple physical memory units located in different physical locations interconnected by a network.

Those skilled in the art will realize that storage devices utilized to store computer readable instructions may be distributed across a network. For example, a computing device 320 accessible via network 318 may store computer readable instructions to implement one or more embodiments provided herein. Computing device 302 may access computing device 320 and download a part or all of the computer readable instructions for execution. Alternatively, computing device 302 may download pieces of the computer readable instructions, as needed, or some instructions may be executed at computing device 302 and some at computing device 320.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting values of a storage set storing a usage bitmap, a journal storing values to be written to the storage set, and at least one storage region at a location in a location set, the method comprising:
   upon receiving a request to write at least one value to a location in the location set, writing the value to the journal; and
   upon receiving a request to evict the value from the journal and before evicting the value from the journal, if the usage bitmap indicates that the location has not previously been written, updating the usage bitmap to indicate that the value exists at the location.

2. The method of claim 1, further comprising: upon receiving an allocation request to generate the storage region, refraining from initializing the storage region.

3. The method of claim 1, at least one location set comprising:
   at least two data locations respectively storing a data value, and
   at least one parity location respectively storing a parity value of the data values of the data locations.

4. The method of claim 3, further comprising: upon receiving a write request to write at least one data value to respective locations of a location set:
   writing the data values to the data locations;
   calculating a parity value for the location set;
   storing the parity value at the parity location for the location set; and
   updating the usage bitmap to indicate values existing at the locations of the location set.

5. The method of claim 4, calculating the parity value comprising:
   if the usage bitmap indicates data values existing at locations of the location set:
      reading stored data values that are stored at other data locations of the location set, and
      calculating the parity value using the stored data values and the data values of the write request; and
   if the usage bitmap does not indicate values existing at the location set, calculating the parity value using the data values of the write request and default values for other data locations of the location set.

6. The method of claim 4:
   at least one unwritten location of the location set not having a data value specified in the write request; and
   the method further comprising: if the usage bitmap does not indicate values existing at the location set, writing default values at respective unwritten locations of the location set.

7. The method of claim 4:
   the write request specifying data values for all data locations of the location set; and
   calculating the parity value comprising: calculating the parity value using the data values of the write request.

8. The method of claim 1, further comprising: upon receiving a request to discard the values of a location set, updating the usage bitmap to indicate that values do not exist at the locations of the location set.

9. The method of claim 1:
   respective location sets comprising at least two resilient values; and
   the method further comprising: upon detecting a failure of a location of the location set:
      if the usage bitmap indicates that values exist for the location set, using other resilient values of the location set, restoring the value at the location set; and
      if the usage bitmap indicates that values do not exist for the location set, refraining from restoring the value at the location set.

10. The method of claim 1, updating the usage bitmap further comprising:
    compressing the usage bitmap to generate a compressed usage bitmap, and
    storing the compressed usage bitmap on the storage device.

11. The method of claim 10, compressing the usage bitmap comprising: run-length encoding the usage bitmap.

12. The method of claim 10, storing the usage bitmap comprising:
    computing a compression ratio of the compressed usage bitmap;
    if the compression ratio is below a compression ratio threshold, store the compressed usage bitmap in the storage set; and
    if the compression ratio is not below the compression ratio threshold, store the usage bitmap in the storage set.

13. The method of claim 10:
   storing the usage bitmap in the storage set comprising:
      storing a usage bitmap sequence of at least two usage bitmaps in at least two locations of the storage set; and
   the method further comprising: upon receiving a usage bitmap read request to read the usage bitmap, reading a latest usage bitmap in the usage bitmap sequence.

14. The method of claim 13:
   respective usage bitmaps stored with a sequence number; and
   storing the usage bitmap comprising: storing the usage bitmap with a higher sequence number than the other usage bitmaps stored in the storage set.

15. The method of claim 13:
   the storage set comprising a usage bitmap log comprising:
      at least two usage bitmap slots, and
      a latest usage bitmap pointer;
   storing the usage bitmap comprising:
      incrementing the latest usage bitmap pointer, and
      storing the usage bitmap at the usage bitmap slot indicated by the latest usage bitmap pointer; and
   reading the latest usage bitmap comprising: reading the usage bitmap in the usage bitmap slot indicated by the latest usage bitmap pointer.

16. A system for presenting values stored in location sets comprising at least two locations of a storage set, the system comprising:
   a usage bitmap generating component configured to, upon receiving an allocation request to generate a storage region in the storage set, generate in the storage set a usage bitmap indicating, for respective location sets of the storage region, whether values exist in the locations of the location set; and
   a storage set write component configured to, upon receiving a write request to write at least one value to a location in the location set, write the value to the journal; and
   a journal updating component configured to, upon receiving a request to evict the value from the journal and before evicting the value from the journal, if the usage bitmap indicates that the location has not previously been written, updating the usage bitmap to indicate that the value exists at the location.

17. The system of claim 16, at least one location set comprising:
   at least two data locations respectively storing a data value, and
   at least one parity location respectively storing a parity value of the data values of the data locations.

18. The system of claim 17, further comprising: a parity value writing component configured to, upon receiving a write request to write at least one data value to respective locations of a location set:
   write the data values to the data locations;
   calculate a parity value for the location set;
   store the parity value at the parity location for the location set; and
   update the usage bitmap to indicate values existing at the locations of the location set.

19. The method of claim 1, further comprising: upon receiving a read request for a value at a location:
   if the usage bitmap indicates that values exist for the location set comprising the location, returning the value stored at the location; and
   if the usage bitmap indicates that values do not exist for the location set comprising the location, returning a default value.

20. A computer-readable memory device storing instructions that, when executed on a processor of a device, cause the device to present values of a storage set having at least one storage region respectively stored at a location in a location set; a journal configured to store values to be written to the storage set; and a usage bitmap, by:
   upon receiving a request to write at least one value to a location in the location set, writing the value to the journal; and
   upon receiving a request to evict the value from the journal and before evicting the value from the journal, if the usage bitmap indicates that the location has not previously been written, updating the usage bitmap to indicate that the value exists at the location.

* * * * *